Jan. 12, 1965  C. W. MOULTRIE  3,165,573
VISION DEVICE FOR VEHICLES
Original Filed Sept. 29, 1958  2 Sheets-Sheet 1
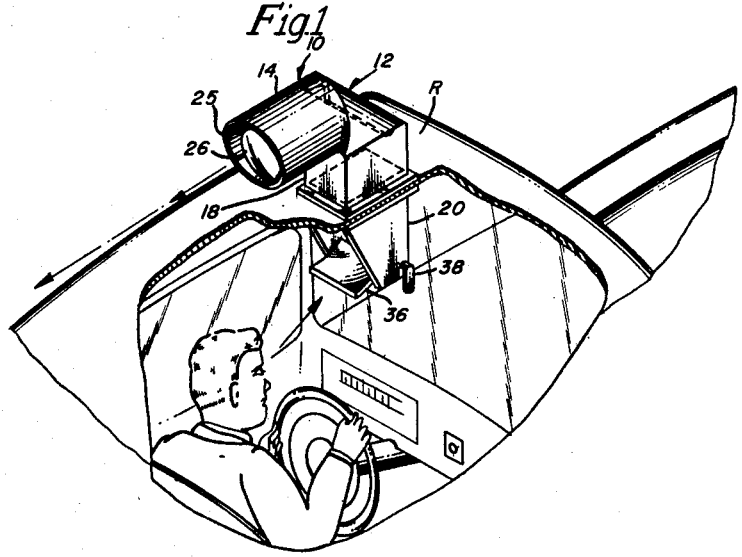
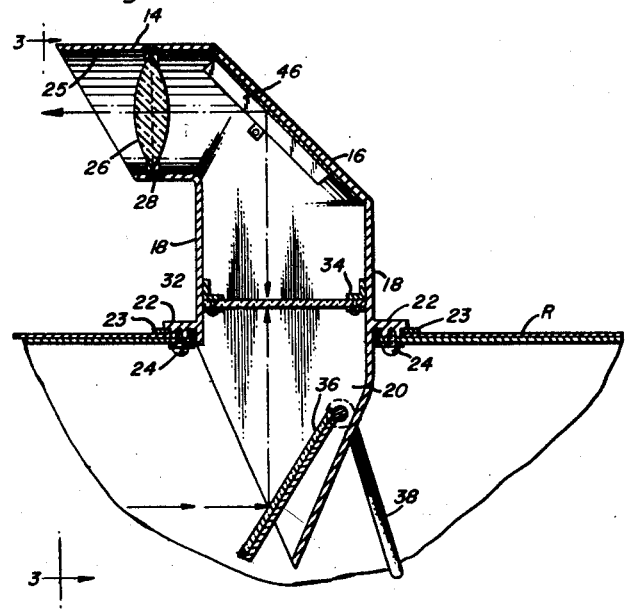
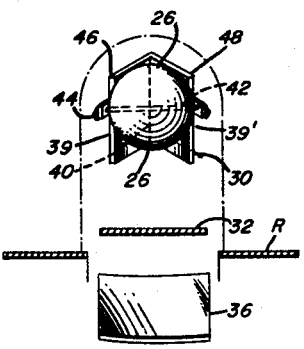
INVENTOR
CHARLES W. MOULTRIE
BY
ATTORNEYS

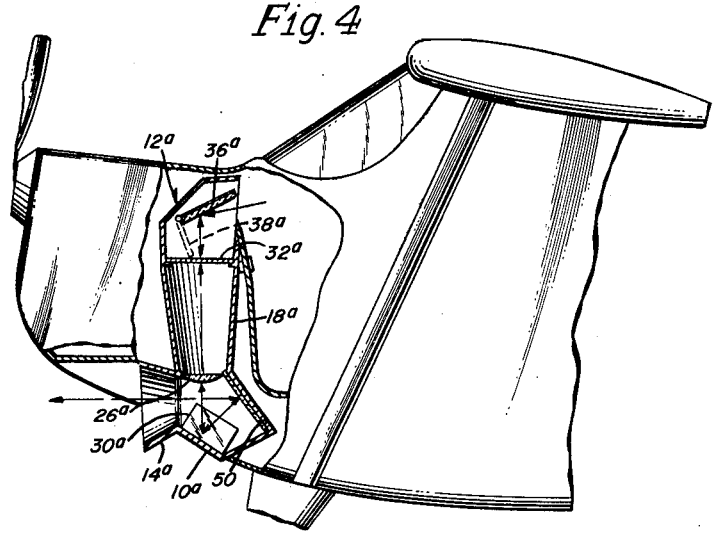
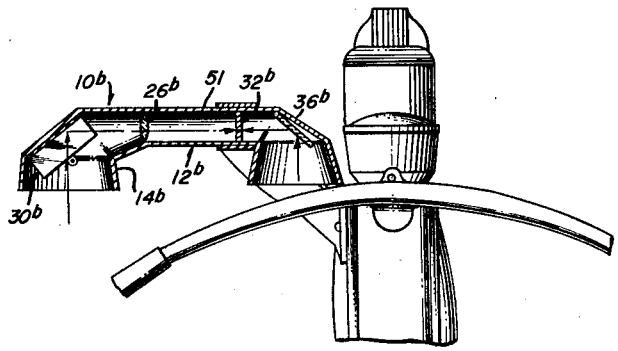
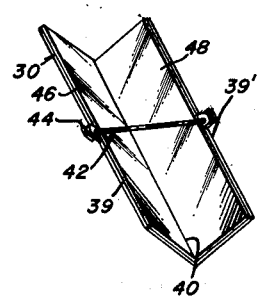
INVENTOR
CHARLES W. MOULTRIE
ATTORNEYS

United States Patent Office 3,165,573
Patented Jan. 12, 1965

3,165,573
VISION DEVICE FOR VEHICLES
Charles W. Moultrie, 1543 E. 85th St., Chicago, Ill.
Original application Sept. 29, 1958, Ser. No. 763,889, now Patent No. 3,043,195, dated July 10, 1962. Divided and this application Mar. 1, 1962, Ser. No. 186,568
1 Claim. (Cl. 88—69)

This is a division of my application Ser. No. 763,889, filed September 29, 1959, now Patent No. 3,043,195.

This invention relates generally to vision devices for use with vehicles and more particularly it relates to an improved periscopic type vision device which enables the viewer to see a true proportion image of a large immediate area which is neither reversed nor inverted and which is of substantially undiminished light intensity.

Although numerous attempts have been made in the past to provide a practical periscopic viewing device for use on vehicles such as automobiles, motorcycles, airplanes, boats, and the like, all of these attempts have been characterized by numerous disadvantageous features as evidenced by the virtual non-use of such devices. Among these disadvantageous features is the fact that in many cases, the particular arrangement of reflectors or mirrors caused the image to appear to the viewer in inverted or reversed position. Needless to say, viewing the scene in front or behind of a moving vehicle in this inverted or reversed position increased the hazards of modern driving, boating or flying.

It is therefore an important object of this invention to provide a periscopic vision device for vehicles which will enable the viewer to see an image in its true position.

It is a well known fact that one of the most essential factors of safe driving is the ability of the vehicle operator to judge distances. This ability is obviously dependent to a great extent upon what the driver actually sees. Thus, for example, when a driver sees an object in front of his vehicle directly with his own eyes, he sees a true proportion image and can therefore fully and truly utilize his faculties in judging the distance to the object. This, unfortunately, is not true where the driver views an object indirectly, as with the common rear-view or sideview mirrors used in today's automobiles. In the latter case, the object viewed always appears smaller to the viewer than if the same were viewed directly. The reason therefor is because the distance between the mirror and the driver's eyes is added to the distance between the object and the mirror, thereby causing the object to appear to the driver as being smaller and farther away than it actually is. Under such conditions, the driver obviously cannot judge the distance of the object as well as he can when the same is viewed directly.

It is therefore another important object of the invention to provide a periscopic vision device for vehicles which will enable the viewer to see an image in its true proportion.

Another object is to afford a vision device for vehicles which substantially eliminates all image distortion and diffraction.

A further object is to provide a vision device for vehicles which eliminates substantially all loss of light intensity within the device so that the image appears in its true light intensity and color.

Heretofore rear-view mirrors were characterized by the objectionable glare from the reflection of the light rays emanating from the head lights of oncoming vehicles. As a matter of fact, numerous accidents have been attributed to temporary blinding of drivers by the aforesaid glare. So dangerous has this objectionable feature become that various attempts have been made to afford non-glare mirrors such as those which may be manually adjusted to change the plane of the mirror thereby avoiding glare. This type of mirror, however, is itself objectionable since it requires at least momentary diversion of the driver's attention and also materially reduces the area and visibility of the rear view.

It is therefore another important object to provide a rear viewing device which entirely eliminates glare without adversely affecting the vision and without requiring any manual adjustment or manipulation.

Still a further object is to afford a vision device for vehicles which is readily adaptable for viewing to the rear, front or side of the vehicle. A related object is to afford a vision device which is readily adaptable for use on any type of moving vehicle.

Yet a further object is to afford a vision device which affords a wide angle panoramic view of greater vista than heretofore attainable by prior vision devices.

Yet another object is to provide a vision device which may be mounted in a vehicle so that the driver thereof may view conditions around his vehicle with a minimum of head and eye movement so that he may more fully concentrate on his driving.

Still another object is to afford a vision device which may be mounted in a vehicle so that all forward viewing blind spots heretofore created by the positioning in the line of sight of such devices as the ordinary automobile rear-view mirror are eliminated. A related object is to afford a vision device whose function is in no way impaired or blocked by the heads of passengers present in the cab of the vehicle.

An additional object is to provide a vision device of the character described which may be inexpensively fabricated and yet is most efficient and sturdy as well as capable of being incorporated during the construction of a new vehicle or installed in any existing vehicle.

With the foregoing and other objects in view which will appear as the description proceeds, the invention consists of certain novel features of construction, arrangement and a combination of parts hereinafter fully described, illustrated in the accompanying drawings, and particularly pointed out in the appended claim, it being understood that various changes in the form, proportion, size and minor details of the structure may be made without departing from the spirit or sacrificing any of the advantages of the invention.

For the purpose of facilitating an understanding of my invention, I have illustrated in the accompanying drawings preferred embodiments thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a perspective view of my vision device showing the same operationally mounted as a rear vision device on the roof of an automobile;

FIG. 2 is a vertical sectional view of the device;

FIG. 3 is a sectional view taken on the plane of broken line 3—3 in FIG. 2 and viewed in the direction indicated showing the optical elements of the device;

FIG. 4 is a sectional view of another embodiment of the device showing the same operationally mounted as a front vision device in the front of an airplane;

FIG. 5 is a horizontal sectional view of still another embodiment of the device showing the same operationally mounted as a side vision device on a motorcycle; and FIG. 6 is a perspective view of the converter element of the device showing certain details of construction.

Turning first to FIG. 1 of the drawings, reference character 10 indicates generally my vision device, the same being mounted as a rear-view device on the roof R of an automobile. Vision device 10 comprises a periscope-like housing 12 which may include a horizontal annular top portion 14, an inclined wall 16, a central vertical portion 18 and a pair of depending bracket members 20, 20. Integrally formed with the vertical portion 18 adjacent the bottom thereof may be a peripheral flange 22, said flange 22 affording a means for attaching the device to the car roof by any conventional fastening means such as washers 23 and screws 24. The housing 12 may be made of any suitable sturdy material such as plastic or metal, and the same may of course vary in over-all appearance as desired. As indicated in FIG. 1, the upper portion 25 of horizontal top portion 14 may be extended to provide a glare shield.

For the purpose of facilitating the illustration and description of the device, the same has been shown in the drawings in somewhat exaggerated form. However it should be understood that in actual practice the device may be made quite compact so that only small portions thereof protrude above the roof R and depend therefrom.

Referring now to the optical elements of my invention, a circular convex lens 26 may be mounted in the horizonal portion 14 by means of a suitable retaining bead 28 formed in the inside wall thereof. Secured to the inclined wall 16 is a two-mirrored converter 30 whose structure and function will subsequently be described in detail. A ground glass screen 32 is positioned in vertical portion 18 by means of a retaining flange such as 34. Positioned beneath screen 32 within the cab of the vehicle is a slightly concave viewing mirror 36. Viewing mirror 36 may be supported by bracket members 20 in a plane oblique to the plane of the screen 32. The plane of the mirror may be rotatably adjusted by means of a pair of arms 38.

Returning now to converter 30, the same may comprise a pair of leaf members 39 and 39' which are hingedly connected together as by a hinge 40. The hinge 40 may include a spring member adapted to normally urge the leaf members apart. Connecting the leaf members at their free ends may be a threaded bolt 42 and a lock nut 44. Bolt 42 and nut 44 afford a means for adjusting the angle between the hingedly connected leaf members 39 and 39', and the bolt should be sufficiently long to permit said angle to be approximately 90°.

Attached to the leaf members by any suitable fastening means such as integrally formed retaining clips, glue, screws, etc. are plane front-surface mirrors 46 and 48. Mirrors 46 and 48 may be of metal or glass, but they should be front-surfaced, for I have found that this type of mirror when used in my converter eliminates diffraction and double images usually present in rear-surface mirrors and also minimizes the loss of light intensity occasioned by reflection.

In operation, my vision device functions optically in the following manner. The light rays from an object enter through lens 26 in the direction indicated by arrows in FIG. 1. The lens causes the image of the object to be inverted and reversed. The inverted and reversed image strikes mirrors 46 and 48 of converter 30. Converter 30, which has been properly pre-positioned so that the angle of incidence is 45° and adjusted so that the angle between the mirrors 46 and 48 is approximately 90°, reflects the image down toward screen 32. It is important to note here that due to the unique double-reflecting action of my converter 30, unlike as in an ordinary plane mirror, the image is reversed instead of only being reflected down onto the screen 32 where it is in effect re-reversed. Also, I have found that this double reflecting action results in a reflected image which is extremely sharp and has lost virtually none of its original light intensity. The image is then focused on ground glass screen 32, said image still being inverted. The operator then views the image on viewing mirror 36. Mirror 36 which is positioned beneath screen 32, re-inverts the image so that the viewer sees the object in its original true position.

It should be noted that the function of the screen 32 is multi-fold. It clarifies and intensifies the image and because of its parallel horizontal relationship to the original line-of-sight of the image it rectifies the distortion or foreshortening resulting from the angular disposition of the converter 30.

The degree of concavity of viewing mirror 36 is extremely small, the same being sufficient only to afford a magnifying power to exactly compensate for the diminished object size which would normally be caused by the remoteness of the object from the eye by that distance comprising the sum of the distances from lens 26 to converter 30, converter 30 to viewing mirror 36 and viewing mirror 36 to the driver's eyes. Thus, the driver of the vehicle, sees an image which is not only in its true position, but also in its true proportion.

Screen 32 may comprise a simple sheet of ground glass. However, I have found that one or more coatings of varnish, lacquer or other transparent substance applied to the ground side of the screen greatly increases the brightness and clarity of the screen image.

It should be apparent from the preceding description that the function and arrangement of elements in my vision device permit the viewing mirror 36 to be positioned in the most desirable location directly in front of the driver's head. Thus, the driver is not required to disconcertingly turn his head or eyes from his normal front view driving position. The blind spot created by the normal automobile rear-view mirror is obviously eliminated. In addition, the function of the device is not affected by passengers in the vehicle who may be positioned in front of the rear window of the cab. Of course, if it is desired, viewing mirror 36 may be independently positioned in the vehicle at any place where it will reflect the image from the screen 32. Thus, for example, viewing mirror 36 may be mounted on the dashboard at the proper reflecting position.

In FIG. 4 is illustrated another embodiment of my invention, similar parts being designated by like reference numerals with the added suffix "a."

In this embodiment, it should be apparent that housing 12a has been modified in configuration so that the same is adapted to provide a front-viewing device for an airplane, with the viewing mirror being mounted on or near the dashboard. Since all of the optical elements here are contained within the airplane and since the physical dimensions of the airplane require the use of greater optical lengths, lens 26a is shown as being plano-convex instead of double convex as shown in the preferred embodiment. Naturally, lens 26a thus has a proportionately longer focal length. An additional plane front-surface reflecting mirror 50 has also been added because of the fact that the device 10a is now being used as a front-viewing device. The pilot therefore again sees a true-position image.

It should be noted that in this embodiment, the relative position of the optical elements has been reversed. And so, for example, converter 30a is at the bottom of the housing, lens 26a is near the bottom of the housing, and viewing mirror 36a is positioned above the screen 32a. The optics, however, remain the same and the same results are achieved. This embodiment is especially useful for viewing the surrounding ground area which would otherwise be hidden during taxiing of the airplane.

In FIG. 5 is illustrated still another embodiment of my invention, this time shown as mounted on a motorcycle. Again similar parts are designated by like reference numerals, in this case with the added suffix "b."

Here the housing 12 has once again been modified in configuration so that the device may now be used as a side-view device as indicated. It should be noted that in this embodiment, the optical elements have also been rearranged. Thus, for example, the object image first is reflected by the converter 30b and then passes through the lens 26b. Again, however, the optics remain the same and the same results are achieved. This embodiment is especially useful on those vehicles where the installation cannot be made overhead but must be viewed through a lens positioned to the side. In such installations the viewing mirror 36b is more remote from the image than in the preferred installation. It is therefore preferable for horizontal portion 14b to be shorter and central portion 51 longer than the corresponding parts in the preferred embodiment. Thus, the image first strikes the converter 30b and then is reflected through the lens 26b which is positioned intermediate the length of the elongated central portion 51. The elongated central portion 51 is feasible because of the utilization of the comparatively long focal length of the lens.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention as defined in the appended claim.

What I claim and desire to secure by Letters Patent of the United States is:

In combination with an aircraft having a cockpit, a front vision device comprising an elongated open-ended housing positioned vertically in said aircraft so that the top end thereof opens into said cockpit, the bottom end of said housing being positioned beneath said cockpit and including a bottom chamber having an annular mouth opening forwardly of said aircraft, a lower inclined wall and an upper inclined wall in vertical alignment with said mouth, a planar mirror mounted on said upper inclined wall at an angle of 45° with the vertical axis of said housing, a converter mounted on said lower inclined wall at an angle of 45° with said axis and in optical alignment with said mirror, said converter comprising a supporting frame and a pair of planar front surface mirrors mounted on said fame in right angle face to face relationship, a plano-convex lens horizontally mounted in said housing above said converter and in optical alignment therewith, a ground glass screen horizontally mounted in said housing above said lens and in optical alignment therewith, said screen being positioned in the focal plane of said lens so that an image may be formed thereon, and a concave viewing mirror pivotally mounted in said top end and in optical alignment with said screen, said first mentioned mirror, converter, lens, screen and viewing mirror being all on the same optical axis and cooperating so that the image of an object viewed by the operator of said aircraft appears on said viewing mirror in its true position and proportion.

References Cited by the Examiner
UNITED STATES PATENTS

| | | | |
|---|---|---|---|
| 370,623 | 9/87 | Hooker | 88—84 |
| 1,666,236 | 4/28 | Fuerth | 88—70 |
| 2,506,764 | 5/50 | Bach | 88—84 |
| 2,512,792 | 6/50 | Delaney | 88—70 |
| 2,546,111 | 3/51 | Rattray | 88—70 |
| 2,551,243 | 5/51 | Campbell | 88—70 |
| 3,001,499 | 9/61 | Hyde | 88—70 |

FOREIGN PATENTS

| | | |
|---|---|---|
| 914,015 | 6/46 | France. |
| 863,717 | 1/53 | Germany. |

JEWELL H. PEDERSEN, *Primary Examiner.*